United States Patent
Mizutani et al.

(10) Patent No.: US 11,450,462 B2
(45) Date of Patent: Sep. 20, 2022

(54) OPERATION DEVICE THAT PRODUCES CLICKING SENSATION, AND ELECTRONIC APPARATUS

(71) Applicant: CANON KABUSHIKI KAISHA, Tokyo (JP)

(72) Inventors: Shoma Mizutani, Tokyo (JP); Taro Fuchigami, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 395 days.

(21) Appl. No.: 16/785,941

(22) Filed: Feb. 10, 2020

(65) Prior Publication Data

US 2020/0265981 A1 Aug. 20, 2020

(30) Foreign Application Priority Data

Feb. 18, 2019 (JP) .............................. JP2019-026685
Mar. 27, 2019 (JP) .............................. JP2019-060926

(51) Int. Cl.
*H04N 5/232* (2006.01)
*H01F 7/02* (2006.01)
*H04N 5/225* (2006.01)

(52) U.S. Cl.
CPC ......... *H01F 7/0205* (2013.01); *H04N 5/2251* (2013.01); *H04N 5/23216* (2013.01)

(58) Field of Classification Search
CPC .............. H04N 5/2251; H04N 5/23216; H01F 7/0205; H01F 7/0252; H01H 2215/00;
(Continued)

(56) References Cited

U.S. PATENT DOCUMENTS

| | | |
|---|---|---|
| 4,086,533 A | 4/1978 | Ricouard et al. |
| 4,899,145 A | 2/1990 | Okuda et al. |
| (Continued) | | |

FOREIGN PATENT DOCUMENTS

| | | |
|---|---|---|
| CN | 101534114 A | 9/2009 |
| CN | 103492830 A | 1/2014 |
| (Continued) | | |

OTHER PUBLICATIONS

Notice of Allowance in Chinese Patent Application No. 202010096642.1, dated Jan. 20, 2022 (with partial English translation).

(Continued)

*Primary Examiner* — Kelly L Jerabek
(74) *Attorney, Agent, or Firm* — Venable LLP

(57) ABSTRACT

An operation device that provides a clicking sensation, with a compact size and excellent durability. The operation device includes an operation member operated by a user. A magnet has a plurality of magnetic poles and is fixed to the operation member. A movable member includes a first magnetic pole portion and a second magnetic pole portion and is pivotally movably arranged on the magnet. When the operation member is operated in a state in which an attractive force is acting between a magnetic pole of the magnet and the first magnetic pole portion, the attractive force acting between them is reduced. Further, by the movement of the movable member, an attractive force comes to act between another magnetic pole of the magnet and the second magnetic pole portion.

24 Claims, 13 Drawing Sheets

(58) Field of Classification Search
CPC .. H01H 2231/046; G03B 17/02; G03B 17/00; G03B 2217/002; G06F 3/0362
See application file for complete search history.

(56) References Cited

U.S. PATENT DOCUMENTS

| | | | |
|---|---|---|---|
| 8,130,123 B2* | 3/2012 | Inoue | G05G 5/03 345/184 |
| 8,378,858 B2 | 2/2013 | Sadamori et al. | |
| 9,075,440 B2 | 7/2015 | Furukawa et al. | |
| 9,697,940 B2 | 7/2017 | Paran et al. | |
| 9,838,010 B2* | 12/2017 | Iwasaki | G01D 5/3473 |
| 10,883,854 B2 | 1/2021 | Drescher | |
| 2009/0079595 A1* | 3/2009 | Naka | G06F 3/0362 341/35 |
| 2009/0231168 A1 | 9/2009 | Sadamori et al. | |
| 2014/0049514 A1 | 2/2014 | Furukawa et al. | |
| 2015/0221426 A1* | 8/2015 | Furuki | H01H 19/11 335/219 |
| 2016/0055950 A1 | 2/2016 | Paran et al. | |
| 2020/0096846 A1 | 3/2020 | Mizutani | |
| 2020/0256704 A1 | 8/2020 | Drescher | |

FOREIGN PATENT DOCUMENTS

| | | |
|---|---|---|
| CN | 105390228 A | 3/2016 |
| CN | 108369111 A | 8/2018 |
| CN | 108780335 A | 11/2018 |
| GB | 1438869 A | 6/1976 |
| JP | 2003-280799 A | 10/2003 |
| JP | 4061128 B2 | 3/2008 |
| JP | 2008-192623 A | 8/2008 |
| JP | 4544323 B2 | 9/2010 |

OTHER PUBLICATIONS

Jul. 28, 2021 Chinese Official Action in Chinese Patent Appln. No. 202010096642.1.

* cited by examiner

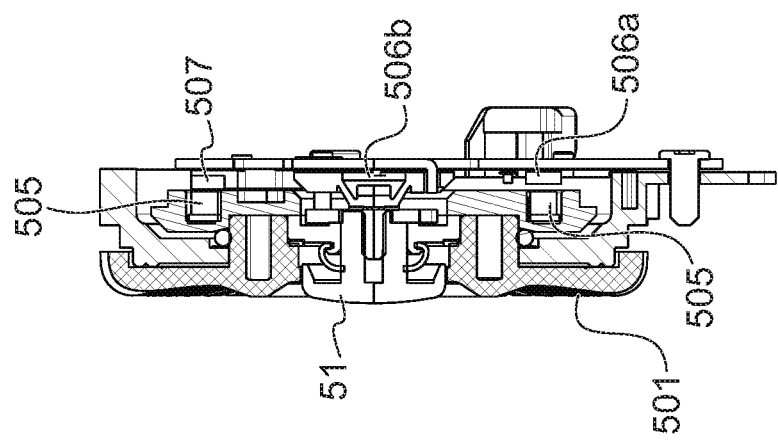
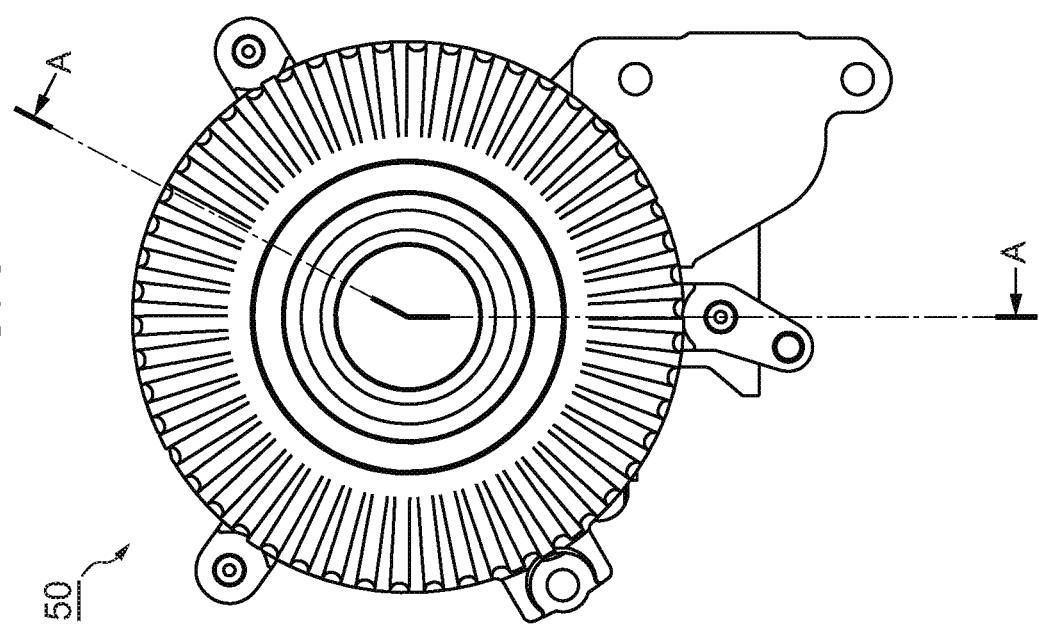

OPERATION DEVICE THAT PRODUCES CLICKING SENSATION, AND ELECTRONIC APPARATUS

BACKGROUND OF THE INVENTION

Field of the Invention

The present invention relates to an operation device and an electronic apparatus, and more particularly to an operation device that produces a clicking sensation when a user operates the operation device.

Description of the Related Art

There has been known a digital camera that includes a rotation operation device or a slide operation device for setting a shooting condition and selecting a function. As such an operation device, there is known one which gives a user a clicking sensation when operated. The user can intuitively grasp an amount of operation based on the clicking sensation. To cause the operation device to produce a clicking sensation, it is known to construct the operation device using an elastic member and a cam. In this case, however, repeated use of the operation device causes abrasion of the elastic member and/or the cam, which degrades the clicking sensation.

As an example of a technique which suppresses abrasion between members as components of an operation device to thereby prevent degradation of a clicking sensation, Japanese Patent No. 4544323 discloses a construction of an operation device which produces a clicking sensation, using an attractive force and a repelling force generated between a fixed magnet and a ring-shaped multipole magnet magnetized with multiple poles in a circumferential direction, and rotates in unison with a rotation operation member.

However, according to the conventional technique disclosed in Japanese Patent No. 4544323, a clicking sensation is produced when the fixed magnet and the multipole magnet overcome a mutually repelled state as they are changed from a mutually attracted state and are placed again into a mutually attracted state. For this reason, to produce one clicking sensation, rotation of the multipole magnet by an amount corresponding to one pole thereof (a pair of S pole and N pole) is required. That is, a multipole magnet is required to have divided poles the number of which is twice the number of clicks generated during one rotation of the rotation operation member. This makes it difficult to downsize the operation device.

SUMMARY OF THE INVENTION

The present invention provides an operation device that provides a clicking sensation, with a compact size and excellent durability, and an electronic apparatus including the operation device.

In a first aspect of the present invention, there is provided an operation device that includes an operation member that is operated by a user, comprising a magnet that is fixed to the operation member and has a plurality of magnetic poles, and a movable member that includes a first magnetic pole portion and a second magnetic pole portion and is arranged such that the movable member is movable relative to the magnet, wherein the first magnetic pole portion and the second magnetic pole portion are provided in the movable member such that when the operation member is operated in a state in which an attractive force is acting between the magnet and the first magnetic pole portion, the attractive force acting between the magnet and the first magnetic pole portion is reduced, and also an attractive force comes to act between the magnet and the second magnetic pole portion by movement of the movable member.

In a second aspect of the present invention, there is provided an operation device provided in an electronic apparatus, comprising an operation section that is disposed such that the operation section is movable in a desired direction, a multipole magnet that is mounted on the operation section such that the multipole magnet is movable in unison with the operation section, and has a plurality of magnetic poles in the desired direction, and a movable member that includes a first magnetic pole portion and a second magnetic pole portion and is arranged such that the movable member is movable in a predetermined direction, wherein the first magnetic pole portion includes a portion that generates a magnetic field in a direction which forms an obtuse angle with a direction of movement of the first magnetic pole portion, and the second magnetic pole portion includes a portion that generates a magnetic field in a direction which forms an obtuse angle with a direction of movement of the second magnetic pole portion, and wherein when the operation section is operated such that the multipole magnet is moved from a state in which an attractive force is acting between one of the magnetic poles of the multipole magnet and the first magnetic pole portion, in a direction in which the attractive force is reduced, the movable member is moved such that an attractive force is generated between another one of the magnetic poles of the multipole magnet and the second magnetic pole portion.

In a third aspect of the present invention, there is provided an electronic apparatus including the operation device as recited in claim 1, and a setting unit configured to make settings according to operation of the operation member.

In a fourth aspect of the present invention, there is provided an electronic apparatus including the operation device as recited in claim 11.

According to the present invention, it is possible to obtain an clicking sensation, with a compact size and excellent durability.

Further features of the present invention will become apparent from the following description of exemplary embodiments (with reference to the attached drawings).

BRIEF DESCRIPTION OF THE DRAWINGS

FIGS. 3A and 3B are a top view and a cross-sectional view of the sub dial.

DESCRIPTION OF THE EMBODIMENTS

The present invention will now be described in detail below with reference to the accompanying drawings showing embodiments thereof. Here, a digital single-lens reflex camera will be described as an electronic apparatus according to the present invention. However, the electronic apparatus according to the present invention is not limited to an image capture apparatus, including the digital single-lens reflex camera.

Figure 1A:
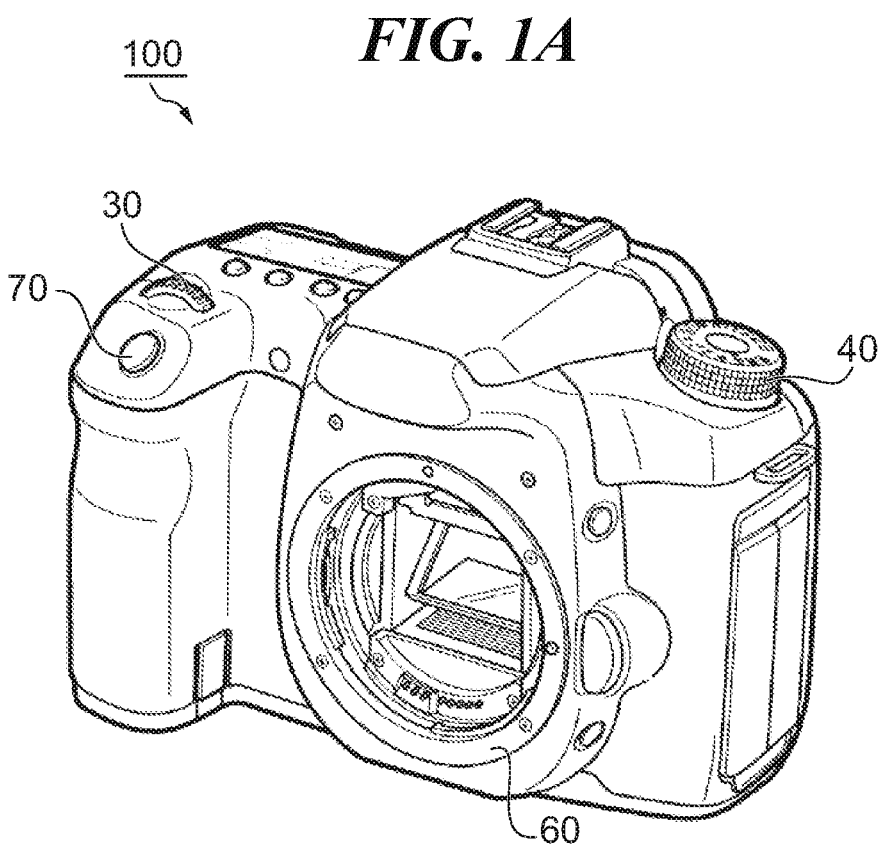
FIGS. 1A and 1B are perspective views of the appearance of a digital single-lens reflex camera according to embodiments of the present invention.
Figure 1B:
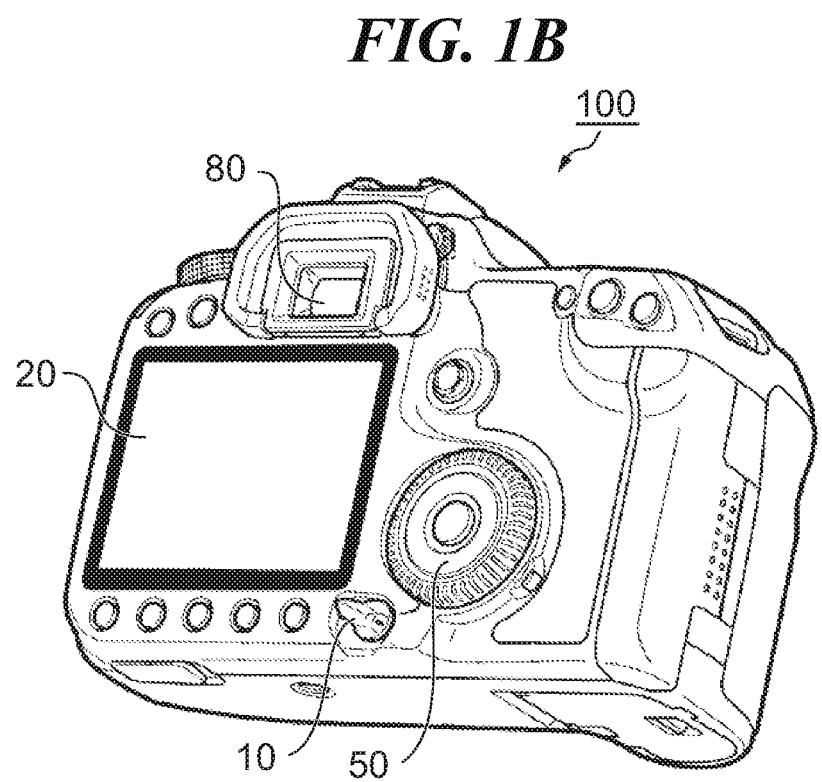

FIG. 1A is a perspective view of the appearance of the digital single-lens reflex camera 100 (hereinafter referred to as the "camera 100"), as viewed from the front. FIG. 1B is a perspective view of the appearance of the camera 100, as viewed from the rear. A lens mount 60 to which and from which a photographic lens unit (not shown) can be mounted and removed is formed on a front side of the camera 100. The camera 100 includes a shutter button 70, which is a switch for starting shooting. By pressing the shutter button 70, a light flux having passed through the photographic lens unit is guided to an image capture device (not shown) to form an optical image, whereby an image corresponding to the optical image, i.e. an object image is obtained from the image capture device.

Referring to FIG. 1B, on a rear side of the camera 100, there is provided a power switch 10 for starting and stopping the camera 100. The camera 100 includes a removable battery unit (not shown). When the power switch 10 is turned on, supply of electric power from the battery unit to various electrical components of the camera 100 is started, whereby it is possible to cause the electrical components to perform various operations. A finder 80 is provided on an upper portion of the rear side of the camera 100. A user can view an object image through the finder 80. A display device 20 using e.g. TFT liquid crystal or organic EL is disposed on a central portion of the rear side of the camera 100. An object image, a shot image, various setting items, and so forth are displayed on the display device 20.

The camera 100 includes a main dial 30, a mode dial 40, and a sub dial 50, as rotation operation devices. These rotation operation devices can each be rotated clockwise (CW) and counterclockwise (CCW) without abutting a stop end, and the rotating operations of the rotation operation devices make it possible to set or change various settings of a shutter speed, a lens aperture value, a shooting mode, and so forth.

Figure 2A:
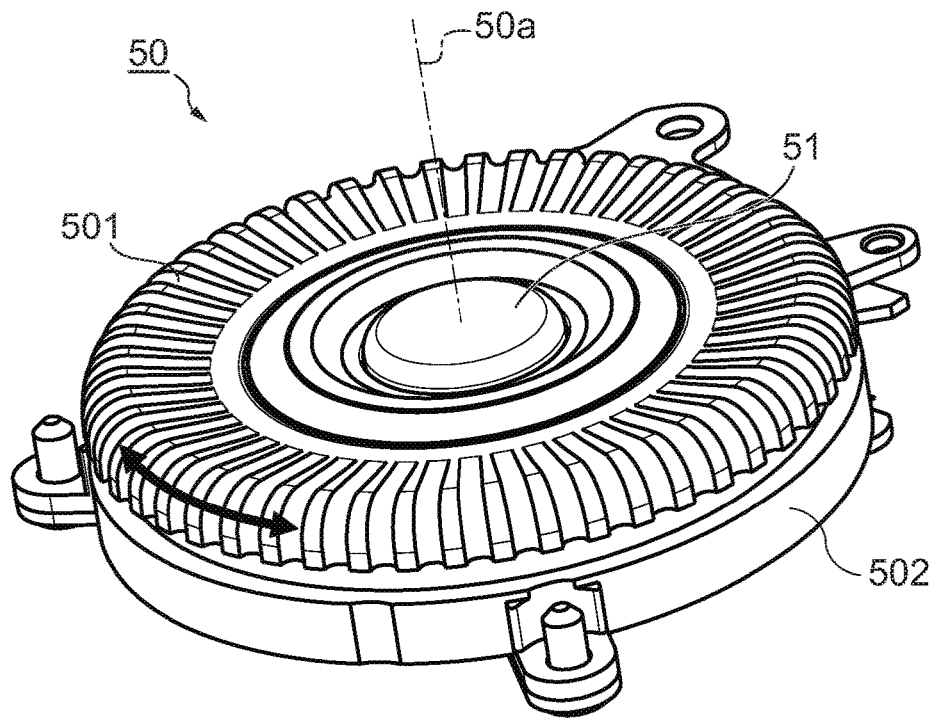
FIGS. 2A and 2B are a perspective view and an exploded view of an operation device (sub dial) according to a first embodiment.
Figure 2B:
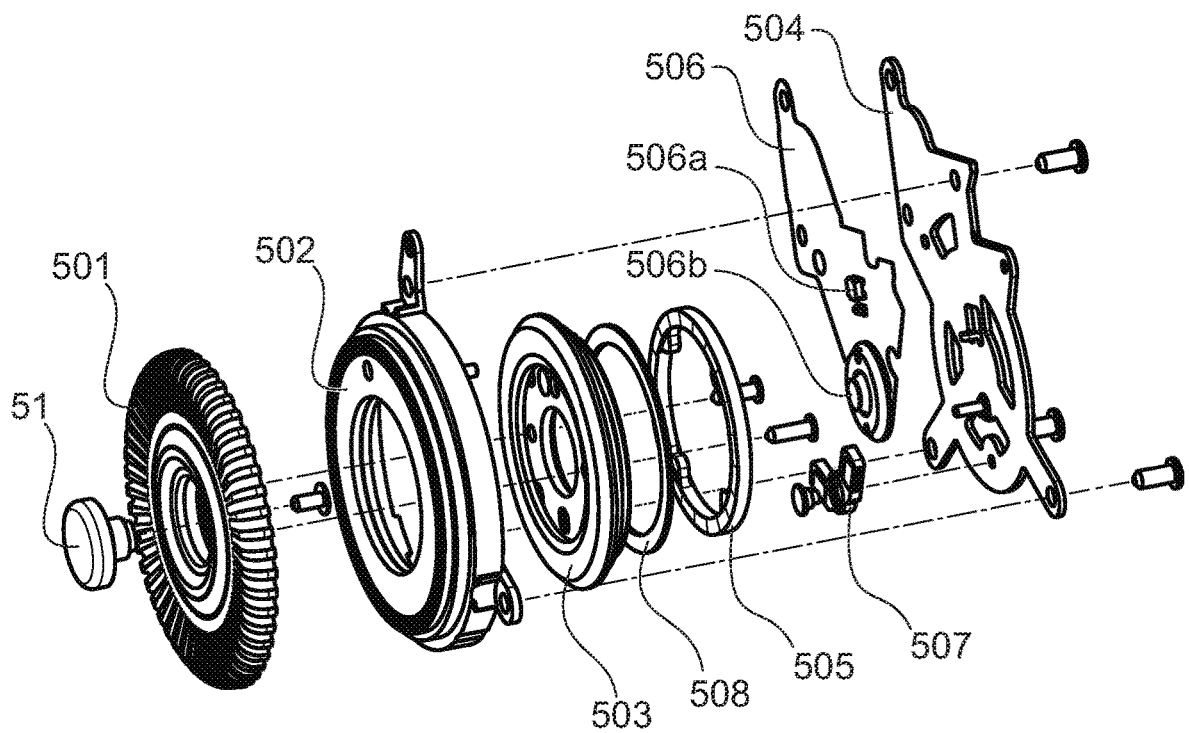

Next, a detailed description will be given of the construction of the sub dial 50 out of the above rotation operation devices, by way of example. FIG. 2A is a perspective view of the sub dial 50 in its entirety. FIG. 2B is an exploded view of the sub dial 50. FIG. 3A is a top view (plan view) of the sub dial 50. FIG. 3B is a cross-sectional view taken along A-A in FIG. 3A.

The sub dial 50 includes a dial operation section 501 that the user operates. The dial operation section 501 can be rotated about a rotational axis 50a. The rotational axis 50a extends along a diametric center of the dial operation section 501 having a ring shape and is orthogonal to the radial direction. On an upper surface of the dial operation section 501, protrusions and recesses are alternatingly formed circumferentially in order to make it easy for the user to operate the dial operation section 501 with his/her finger(s). A set button 51 is disposed at a central portion of the sub dial 50. By depressing the set button 51, a setting is changed to (determined as) a value indicated by a user operation of the dial operation section 501. The dial operation section 501 is fastened to a magnet holding member 503 with a dial holding member 502 interposed therebetween, by working from the reverse side, and is held rotatable on the dial holding member 502.

A shield member 508 and a multipole magnet 505 are fixed to the magnet holding member 503. Therefore, when the dial operation section 501 is rotated, the multipole magnet 505 and the magnet holding member 503 rotate in unison with the dial operation section 501. The shield member 508 is formed of a magnetic material, and is disposed between the magnet holding member 503 and the multipole magnet 505. The shield member 508 prevents leakage of magnetic flux from the multipole magnet 505 toward the dial operation section 501 and electromagnetically shields magnetic field noise flowing in from outside. This makes it possible to suppress the influence of the magnetic field noise on detection of rotation of the sub dial 50.

A detection board 506 is arranged on the reverse side of the multipole magnet 505. A hall IC 506a is mounted on the detection board 506 at a location opposed to the multipole magnet 505. By detecting a change in the magnetic flux caused by the rotation of the multipole magnet 505 using the hall IC 506a, it is possible to detect a rotation step-based amount which is dependent on a direction of the rotation and the number of divided poles of the multipole magnet 505. Note that the hall IC 506a and the multipole magnet 505 are out of contact with each other, and a gap is formed therebetween within a range in which the hall IC 506a can detect the magnetic flux.

The detection board 506 is provided with a set button detection section 506b formed by an elastic member. The set button detection section 506b is in contact with the lower end of the set button 51. When the set button 51 is depressed, the set button detection section 506b is elastically deformed to be electrically connected to a pattern (not shown) on the detection board 506, whereby the depression of the set button 51 is detected.

Figure 4A:
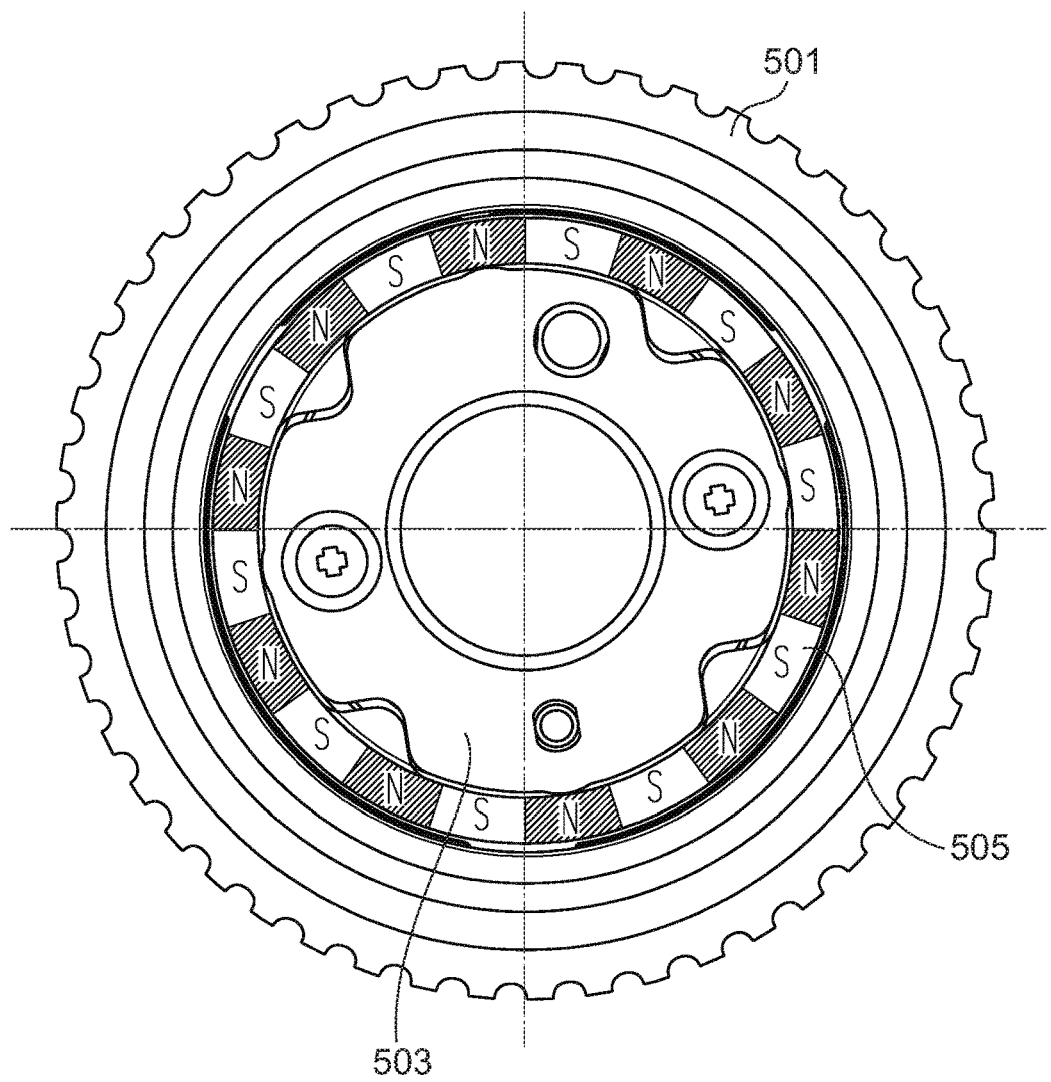
FIGS. 4A and 4B are a plan view and a perspective view of a multipole magnet and a movable member, which form the sub dial, respectively.
Figure 4B:
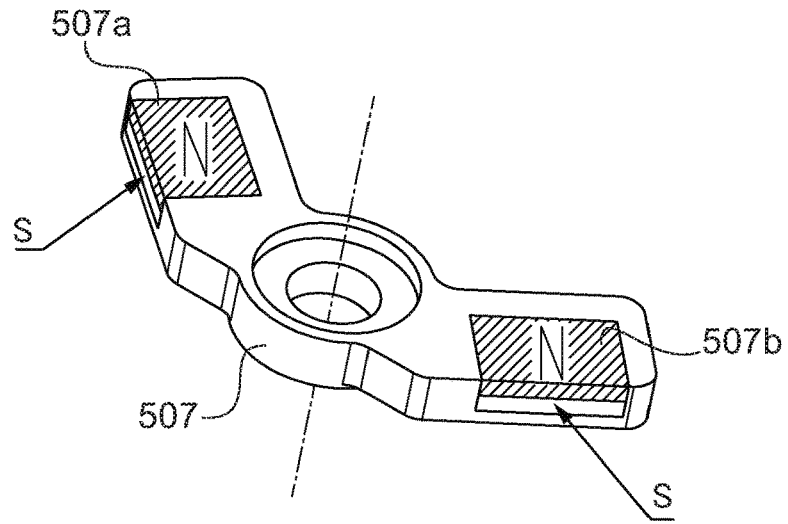

FIG. 4A is a plan view of the multipole magnet 505. FIG. 4B is a perspective view of the appearance of a movable member 507 included in the sub dial 50. The multipole magnet 505 has a ring shape, and is divided into a plurality of divided poles such that S poles and N poles are alternatingly arranged circumferentially. The S poles and the N poles are magnetized in an axial direction of the rotational axis 50a (thrust direction of the multipole magnet 505), respectively. Although in the first embodiment, the multipole magnet 505 is divided into twenty magnetic poles at equally-spaced intervals in the circumferential direction, the spaced intervals and the number of divided poles (the number of magnet divisions) are not limited to these.

The movable member 507 is a magnet for producing a clicking sensation during rotating operation of the sub dial 50, and is rotatably supported about pivotal axis thereof by a dial base portion 504. The movable member 507 is comprised of a first magnetic pole portion 507a and a second magnetic pole portion 507b. The movable member 507 is arranged such that the first and second magnetic pole portions 507a and 507b are close to and opposed to magnetized surfaces of the multipole magnet 505 (see FIG. 3B, and FIGS. 5A to 5C, referred to hereinafter). Note that in the first embodiment, each of the first magnetic pole portion 507a and the second magnetic pole portion 507b has the N pole on a surface opposed to the multipole magnet 505.

Figure 5C:
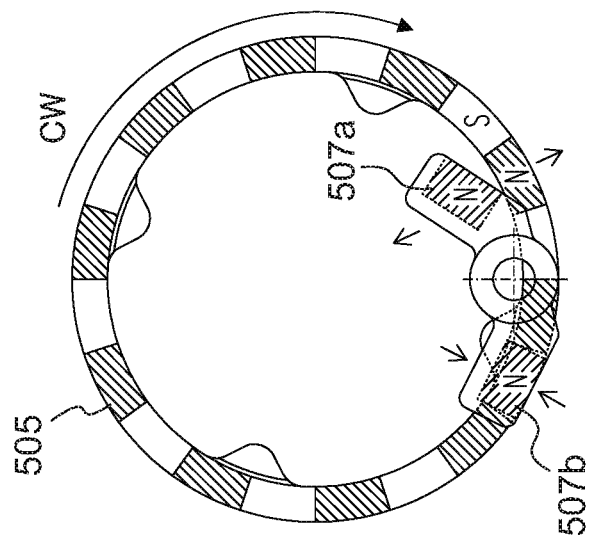
FIGS. 5A to 5C are plan views useful in explaining movement of the movable member with respect to the multipole magnet when a dial operation section is rotated.
Figure 5B:
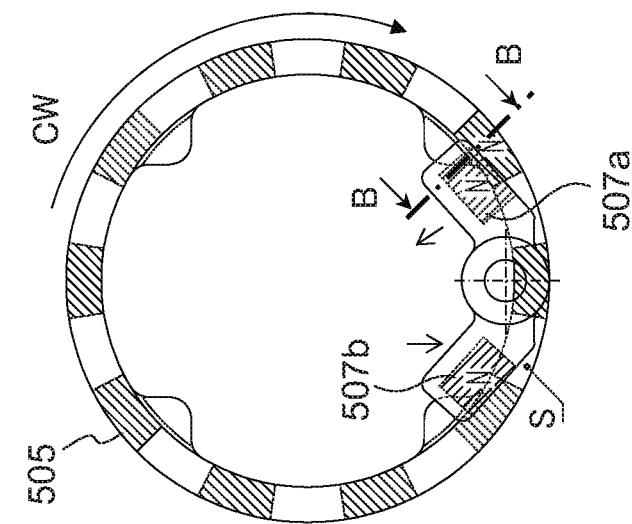
Figure 5A:
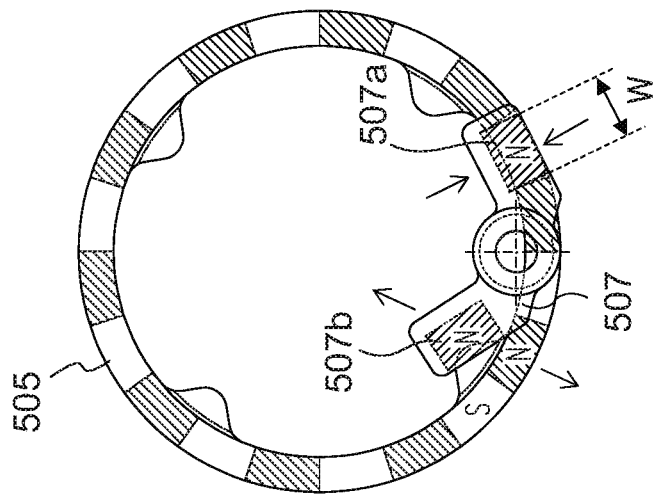

Next, a description will be given of a mechanism that produces a clicking sensation during the rotating operation of the sub dial 50. FIGS. 5A to 5C are plan views useful in explaining the movement of the movable member 507 with respect to the multipole magnet 505 during the rotating operation of the dial operation section 501 (as viewed from the thrust direction of the multipole magnet 505 (axial direction of the rotational axis 50a)). Note that in FIGS. 5A to 5C, the N poles are indicated by diagonal hatching, and the S poles are indicated by non-hatching, for clarity.

FIG. 5A shows a state in which the dial operation section 501 (the sub dial 50) is in a standby state before being operated. In the FIG. 5A state, one of the S poles of the multipole magnet 505 and the N pole of the first magnetic pole portion 507a of the movable member 507 are substantially entirely opposed to each other, so that an attractive force acts therebetween. At the same time, one of the N poles of the multipole magnet 505 is positioned in the vicinity of the N pole of the second magnetic pole portion 507b, so that a repelling force is generated therebetween. Therefore, a positional relationship between the multipole magnet 505 and the movable member 507 is stable in the FIG. 5A state, and the attractive force between the multipole magnet 505 and the first magnetic pole portion 507a acts as a force for holding the sub dial 50 in a stationary state.

At this time, to obtain a stable force for holding the sub dial 50 in the stationary state, it is desirable that an overlapping area between the first magnetic pole portion 507a and the multipole magnet 505, as viewed from the axial direction of the rotational axis 50a, is seven or more times as large as an overlapping area between the second magnetic pole portion 507b and the multipole magnet 505. Note that the second magnetic pole portion 507b and the multipole magnet 505 are not necessarily required to overlap between them.

When the dial operation section 501 is rotated from the FIG. 5A state in the CW direction, the FIG. 5A state shifts to a state shown in FIG. 5B. The FIG. 5B state is a state in which the dial operation section 501 has been rotated from the FIG. 5A state in the CW direction by an amount corresponding to the width of half of one magnetic pole (half of one divided pole) of the multipole magnet 505.

The one of the S poles of the multipole magnet 505 and the N pole of the first magnetic pole portion 507a of the movable member 507, which are attracted to each other, are separated by an user's operation force acting on the dial operation section 501. In other words, it is necessary to rotate the dial operation section 501 against the attractive force acting between the one of the S poles of the multipole magnet 505 and the N pole of the first magnetic pole portion 507a. When the multipole magnet 505 is thus rotated in the CW direction to bring one of the N poles of the multipole magnet 505 closer to the N pole of the first magnetic pole portion 507a, a repelling force between the multipole magnet 505 and the first magnetic pole portion 507a starts to be generated. On the other hand, since one of the S poles of the multipole magnet 505 is brought closer to the N pole of the second magnetic pole portion 507b, an attractive force starts to be generated between the multipole magnet 505 and the second magnetic pole portion 507b.

The FIG. 5B state is unstable, and the attractive force and the repelling force generated between the multipole magnet 505 and the movable member 507 cause the multipole magnet 505 and the movable member 507 to shift to a state shown in FIG. 5C. In the course of transition from the FIG. 5A state to the FIG. 5C state, the overlapping area between the second magnetic pole portion 507b and the multipole magnet 505 becomes larger than the overlapping area between the first magnetic pole portion 507a and the multipole magnet 505, so that a magnitude relationship between the overlapping areas is reversed from the FIG. 5A state.

When the dial operation section 501 is further rotated in the CW direction from the FIG. 5B state, the FIG. 5B state shifts to the FIG. 5C state. The FIG. 5C state is a state in which the rotation of the dial operation section 501 from the FIG. 5A state by an amount corresponding to one magnetic pole (one divided pole) of the multipole magnet 505 has been completed. One of the S poles of the multipole magnet 505 and the N pole of the second magnetic pole portion 507b of the movable member 507 are opposed to each other so that an attractive force acts therebetween. Further, one of the N poles of the multipole magnet 505 is positioned in the vicinity of the N pole of the first magnetic pole portion 507a of the movable member 507, so that a repelling force is generated therebetween. Therefore, in the FIG. 5C state, a force for stopping the rotation of the dial operation section 501 acts.

In the FIG. 5C state, similar to the FIG. 5A state, it is desirable that the overlapping area between the second magnetic pole portion 507b and the multipole magnet 505, as viewed from the axial direction of the rotational axis 50a, is seven or more times as large as the overlapping area between the first magnetic pole portion 507a and the multipole magnet 505. However, the first magnetic pole portion 507a and the multipole magnet 505 are not necessarily required to overlap between them.

While rotating the dial operation section 501 by an amount corresponding to one magnetic pole (18 degrees) for transition from the FIG. 5A state to the FIG. 5C state, first, the user is required to give the dial operation section 501 a force for separating the first magnetic pole portion 507a and the multipole magnet 505, which are attracted to each other. After that, however, even if the user reduces a force for rotating the dial operation section 501, a force for attracting the second magnetic pole portion 507b to the multipole magnet 505 acts on the dial operation section 501, so that the dial operation section 501 can be shifted to the FIG. 5C state. This makes it possible for the user to positively obtain a clicking sensation in each step of rotation of the dial operation section 501 by the amount corresponding to one magnetic pole, and thereby perform an intuitive operation of the dial operation section 501. Further, the multipole magnet 505 is only required to have the same number of divided poles as the number of clicks generated during one rotation of an operation member (the dial operation section 501), and hence it is easy to downsize the multipole magnet.

Note that in a case where the dial operation section 501 is operated in an opposite direction (CCW direction), the FIG. 5C state shifts to the FIG. 5A state via the FIG. 5B state. In this case, a clicking sensation is produced by the same mechanism as in the above-described case of rotating operation of the dial operation section 501 in the CW direction.

Incidentally, in a case where a width W of each of the first magnetic pole portion 507a and the second magnetic pole portion 507b, indicated in FIG. 5A, is shorter than the width of one magnetic pole of the multipole magnet 505, a time lag from the start of operation of the dial operation section 501 until generation of a clicking sensation becomes larger. To avoid this inconvenience, the width W is designed to be substantially equal to the width of one magnetic pole of the multipole magnet 505. This makes it possible, when the user operates the dial operation section 501, to provide the user with a clicking sensation with little play.

Further, during transition from the FIG. 5A state to the FIG. 5C state, the multipole magnet 505 and the movable member 507 produce a clicking sensation by the attractive forces and the repelling forces while always maintaining a fixed gap therebetween without any contact with each other. By thus producing a clicking sensation in a non-contact fashion, it is possible to prevent generation of abrasion even when the rotating operation is repeatedly performed, whereby it is possible to realize the sub dial 50 having high durability. Further, during the rotating operation of the dial operation section 501, the attractive force and the repelling force, which are generated by constant, at least partial, overlap between the magnetic pole surfaces of the multipole magnet 505 and the movable member 507, as viewed from the axial direction of the rotational axis 50a, mutually act on the multipole magnet 505 and the movable member 507. This makes it possible to stably produce a clicking sensation without loss of an operation sensation during the rotating operation of the dial operation section 501.

Figure 6:
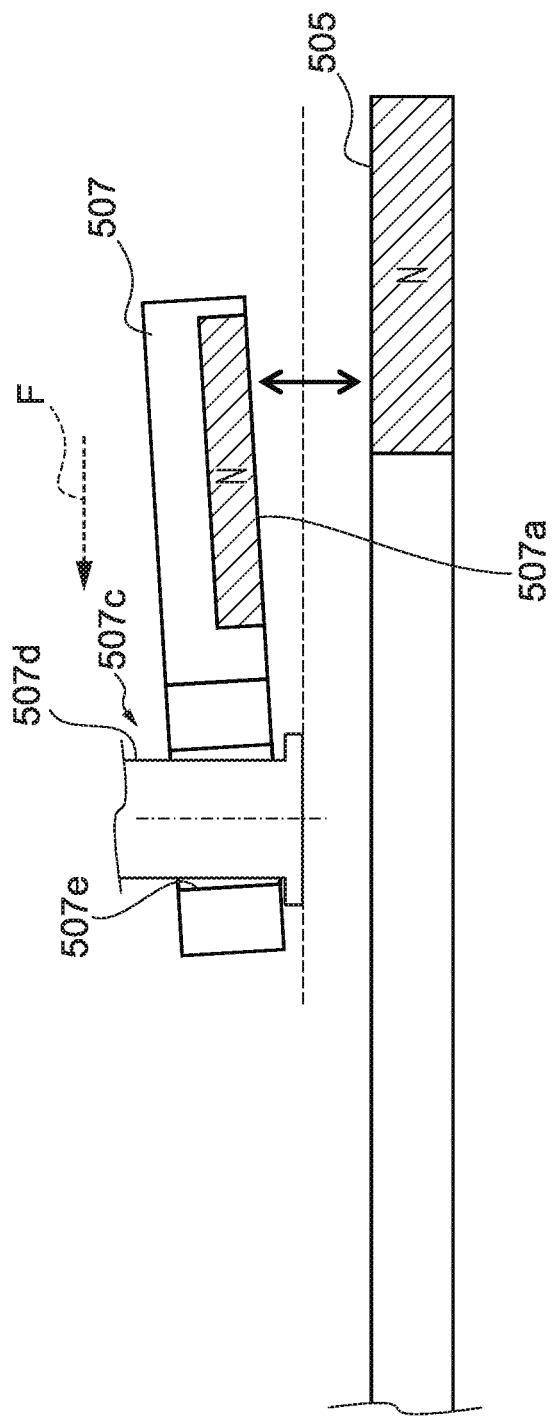
FIG. 6 is a schematic partial cross-sectional view taken along B-B in FIG. 5B.

Next, a description will be given of the arrangement of a pivotal axis portion 507c of the movable member 507 with reference to FIG. 6. FIG. 6 is a schematic partial cross-sectional view taken along B-B in FIG. 5B. The movable member 507 rotates between a state in which substantially the whole of one of the first magnetic pole portion 507a and the second magnetic pole portion 507b overlaps the multipole magnet 505, and a state in which part of the first magnetic pole portion 507a and part of the second magnetic pole portion 507b overlap an inner peripheral-side portion of the multipole magnet 505. The pivotal axis portion 507c of the movable member 507 is provided with a minute fitting play for rotation of the movable member 507, that is, a gap between the outer peripheral surface of a pivotal shaft 507d and the inner peripheral surface of a hole portion 507e formed in the movable member 507 for insertion of the pivotal shaft 507d.

Therefore, during transition from the FIG. 5A state to the FIG. 5B state, the movable member 507 is tilted, as shown in FIG. 6, by the repelling force generated between the multipole magnet 505 and the movable member 507. By arranging the pivotal axis of the movable member 507 inside the inner periphery of the multipole magnet 505, the tilt is generated such that a side of the movable member 507 toward the center of the sub dial 50 becomes lower than a side thereof toward the outer periphery of the sub dial 50. As a consequence, a force for moving the movable member 507 in a direction indicated by a broken line arrow F in FIG. 6, i.e. a force for pivotally moving the movable member 507 about the pivotal axis acts on the movable member 507, whereby it is possible to pivotally move the movable member 507.

Note that although in the first embodiment, the pivotal axis of the movable member 507 is arranged inside the inner periphery of the multipole magnet 505, it is possible to arrange the pivotal axis of the movable member 507 outside the outer periphery of the multipole magnet 505. However, in the construction in which the movable member 507 is arranged outside the multipole magnet 505, the entire sub dial is more likely to be larger than in the construction in which the movable member 507 is arranged inside the multipole magnet 505. To avoid this inconvenience, from the viewpoint of making the sub dial 50 more compact in size, it is desirable to arrange the pivotal axis of the movable member 507 inside the inner periphery of the multipole magnet 505.

Further, although in the first embodiment, the description is given of the rotation operation device which produces a clicking sensation by the multipole magnet 505 magnetized in the thrust direction, and the movable member 507, the magnetization direction is not limited to this, but for example, it is possible to magnetize the multipole magnet 505 in the radial direction. Further, although in the first embodiment, the rotational axis 50a of the multipole magnet 505 and the pivotal axis of the movable member 507 are arranged in parallel with each other, this is not limitative, but for example, the rotational axis 50a of the multipole magnet 505 and the pivotal axis of the movable member 507 can be arranged such that they are orthogonal to each other.

Figure 7:
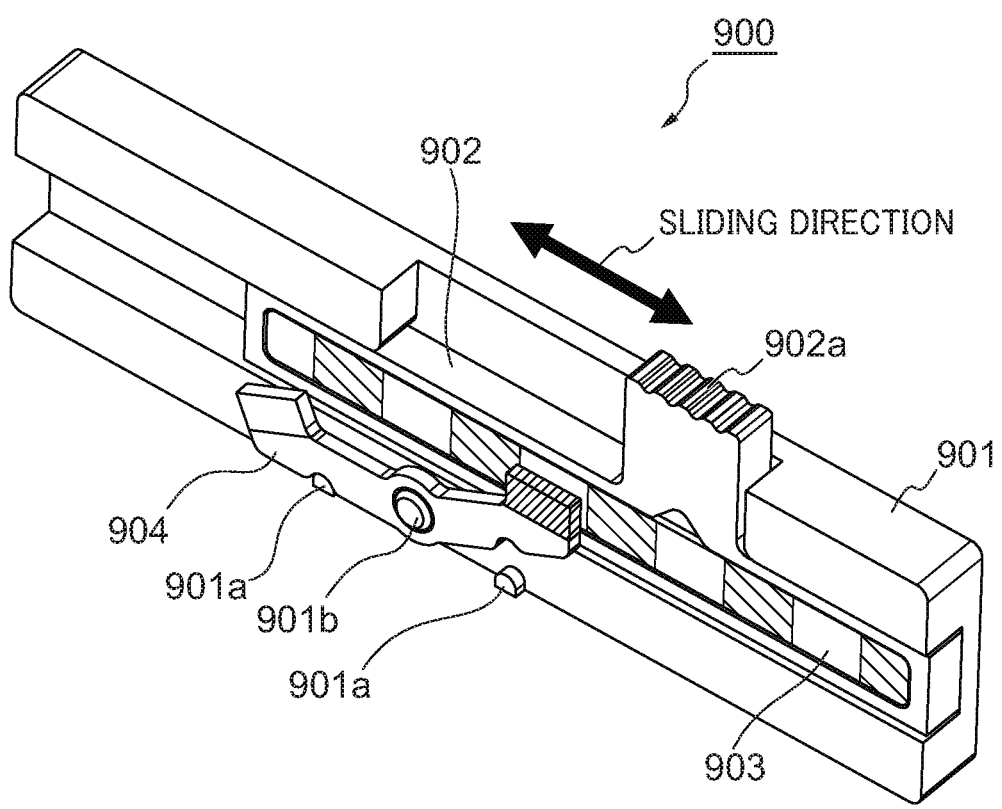
FIG. 7 is a perspective view of an operation device (slide operation device) according to a second embodiment.
Figure 8B:
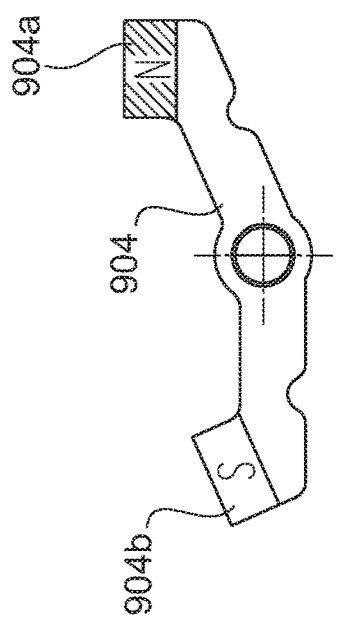
FIGS. 8A and 8B are diagrams useful in explaining magnet components that form the slide operation device.
Figure 8A:
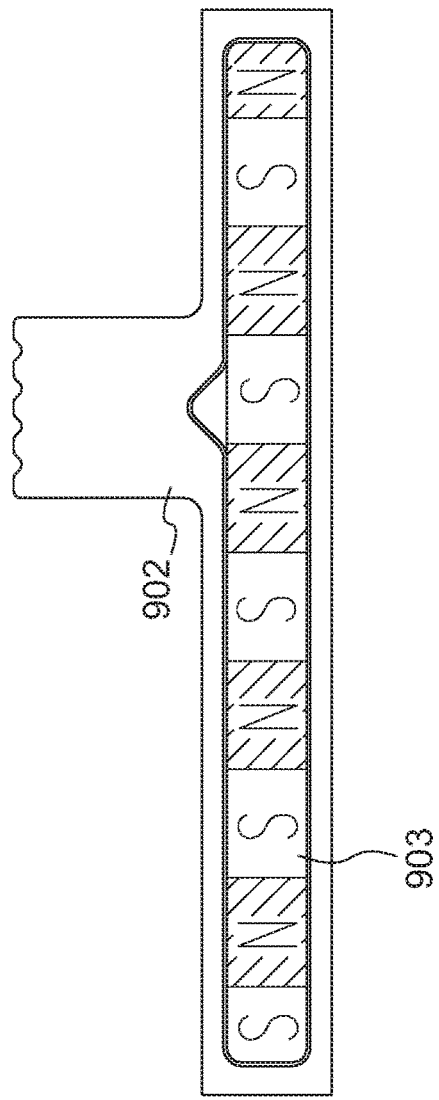

Next, a second embodiment of the present invention will be described. Although in the first embodiment, the description is given of the rotation operation device, in the second embodiment, a description will be given of a slide operation device which produces a clicking sensation during a linear sliding operation thereof. FIG. 7 is a perspective view of the slide operation device 900. FIG. 8A is a diagram useful in explaining a multipole magnet 903, which is one of magnet components that form the slide operation device 900. FIG. 8B is a diagram useful in explaining a movable member 904, which is another of the magnet components that form the slide operation device 900.

The slide operation device 900 includes a slider holding member 901 as a base, and a slider 902 movably held by the slider holding member 901 in a linear direction indicated by an arrow. The slider 902 is provided with a protrusion 902a that the user touches when operating the slider 902. Further, the multipole magnet 903, which has a bar shape and longitudinally extends in the sliding direction of the slider 902, is fixed to the slider 902. On an upper surface of the protrusion 902a, protrusions and recesses are alternatingly formed in the sliding direction such that the user can easily operate the slider 902 with his/her finger(s).

The multipole magnet 903 has a structure in which S poles and N poles are alternatingly magnetized in a longitudinal direction thereof. Although in the second embodiment, the multipole magnet 903 is divided into ten poles, by way of example, the spaced intervals and the number of divided poles are not limited to these. The movable member 904 is a magnet for producing a clicking sensation by generating an attractive force and a repelling force with respect to the multipole magnet 903, and is rotatably supported by the slider holding member 901 about a pivotal shaft 901b provided in the slider holding member 901. The slider holding member 901 is provided with stoppers 901a as restriction members for restricting a range of pivotal movement of the movable member 904. The movable member 904 includes a first magnetic pole portion 904a and a second magnetic pole portion 904b. Although in the first embodiment, the movable member 507 is provided with two N poles on a surface opposed to the multipole magnet 505, the movable member 904 in the second embodiment has an S pole and an N pole provided on a surface opposed to the multipole magnet 903. However, it is possible to use another combination of magnetic poles, and it is also possible to employ a component, such as the movable member 507, formed by combining two magnets.

The movable member 904 is arranged such that the magnetized surfaces of the respective first and second magnetic pole portions 904a and 904b are close to and opposed to magnetized surfaces of the multipole magnet 903. Thus, an attractive force and a repelling force are generated between the multipole magnet 903 and the movable member 904 according to a combination of the magnetic poles of the multipole magnet 903 and the first and second magnetic pole portions 904a and 904b.

Figure 9A:
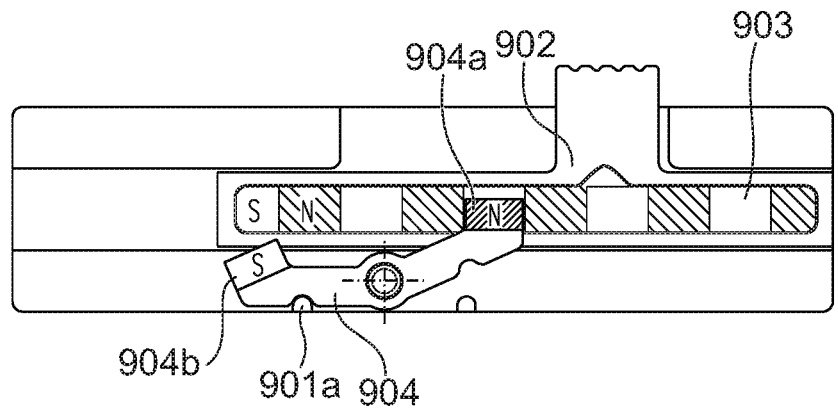
FIGS. 9A to 9C are plan views useful in explaining movement of a movable member with respect to a multipole magnet during a sliding operation of a slider.
Figure 9B:
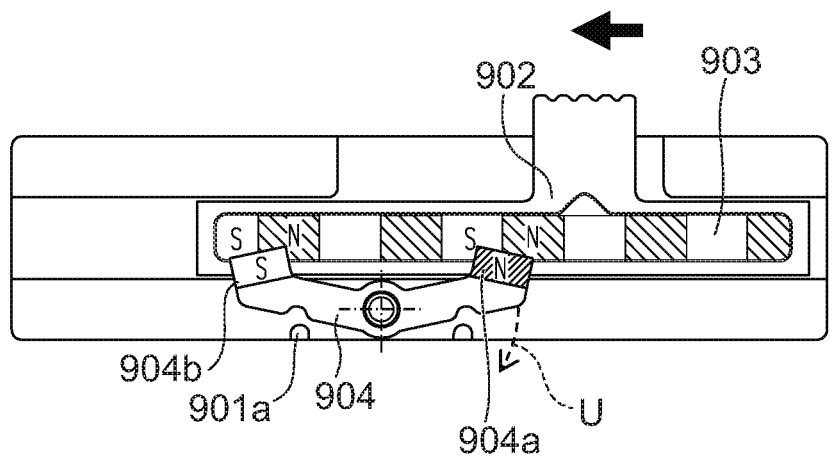
Figure 9C:
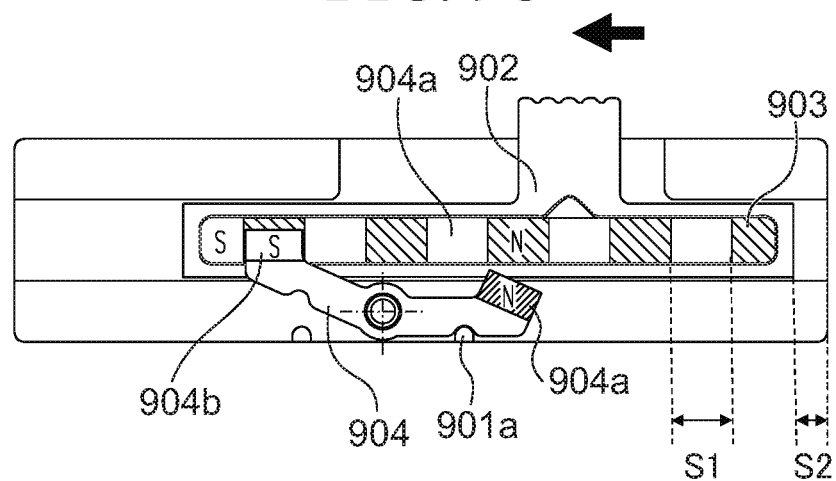

FIGS. 9A to 9C are plan views useful in explaining the movement of the movable member 904 with respect to the multipole magnet 903 during a sliding operation of the slider 902. Note that in FIGS. 9A to 9C, the N poles are indicated by diagonal hatching, and the S poles are indicated by non-hatching, for clarity.

FIG. 9A shows a standby state before the slider 902 is operated. In the FIG. 9A state, one of the S poles of the multipole magnet 903 and the N pole of the first magnetic pole portion 904a of the movable member 904 are opposed to each other, so that an attractive force acts therebetween. At the same time, one of the S poles of the multipole magnet 903 is positioned in the vicinity of the S pole of the second magnetic pole portion 904b, so that a repelling force is generated therebetween. Therefore, a positional relationship between the multipole magnet 903 and the movable member 904 is stable in the FIG. 9A state, and the attractive force between the multipole magnet 903 and the first magnetic pole portion 904a acts as a force for holding the slider 902 in a stationary state.

When the slider 902 is operated from the FIG. 9A state in the left direction, the FIG. 9A state shifts to the FIG. 9B state. By a user's operation force acting on the slider 902, the N pole of the first magnetic pole portion 904a of the movable member 904 is moved away from the one of the S poles of the multipole magnet 903 attracting the N pole of the first magnetic pole portion 904a. At the same time, one of the N poles of the multipole magnet 903 is brought closer to the N pole of the first magnetic pole portion 904a, whereby a repelling force is generated between the first magnetic pole portion 904a and the multipole magnet 903, and this repelling force causes the movable member 904 to be pivotally moved in a direction indicated by a broken line arrow U. At this time, even when the movable member 904 attempts to pivotally move in a direction opposite to the direction indicated by the broken line arrow U, the movable member 904 rotates only in the direction indicated by the broken line arrow U since the movable member 904 is brought into abutment with one of the stoppers 901a. That is, pivotal movement of the movable member 904 in a wrong direction is prevented by the stopper 901a, whereby it is possible to positively generate a desired clicking sensation.

The FIG. 9B state is unstable, and the attractive force and the repelling force generated between the multipole magnet 903 and the movable member 904 contributes to causing the multipole magnet 903 and the movable member 904 to shift to a state shown in FIG. 9C. When the slider 902 is further operated in the left direction from the FIG. 9B state, the FIG. 9B state shifts to the FIG. 9C state.

One of the N poles of the multipole magnet 903 and the S pole of the second magnetic pole portion 904b of the movable member 904 are made closer to each other, whereby an attractive force is generated therebetween. Further, since the N pole of the first magnetic pole portion 904a is brought closer to the one of the N poles of the multipole magnet 903, a repelling force is generated therebetween. The attractive force and the repelling force thus generated acts as a force for holding the slider 902 stationary at a location where the slider 902 has been moved from the FIG. 9A state in the left direction by an amount corresponding to a width S2 appearing in FIG. 9C.

During transition from the FIG. 9A state to the FIG. 9C state, a force for separating the multipole magnet 903 and the first magnetic pole portion 904a acts on the slider 902, whereafter a force for attracting the second magnetic pole portion 904b to the multipole magnet 903 acts on the slider 902. With this, when operating the slider 902, the user can obtain a clicking sensation at set spaced intervals, whereby it is possible to perform an intuitive operation of the slider 902. In a case where slider 902 is slid in an opposite direction (right direction), the state transition is performed in the order of the FIG. 9C state, the FIG. 9B state, and the FIG. 9A state, and a clicking sensation is produced by the same mechanism as in the above-described case of the sliding operation in the left direction.

In the first embodiment, the description is given of the case where a clicking sensation is produced in each phase where the movable member is moved by the amount corresponding to one magnetic pole of the multipole magnet 505. On the other hand, in the second embodiment, as shown in FIG. 9C, the width S2 and a width S1 of one magnetic pole are not equal. As described above, the spaced interval at which a clicking sensation is produced is not limited to a spaced interval corresponding to one magnetic pole, but can be adjusted (set). Further, although in the second embodiment, the description is given of the sliding operation in the linear direction, various variations and modifications thereof, including an application to a slide operation device that can be moved along a curved rail, are possible within the scope of the present invention. The amount of operation of the slide operation device 900 can be detected using the hall IC, similar to the first embodiment, and hence detailed description thereof is omitted.

Figure 10A:
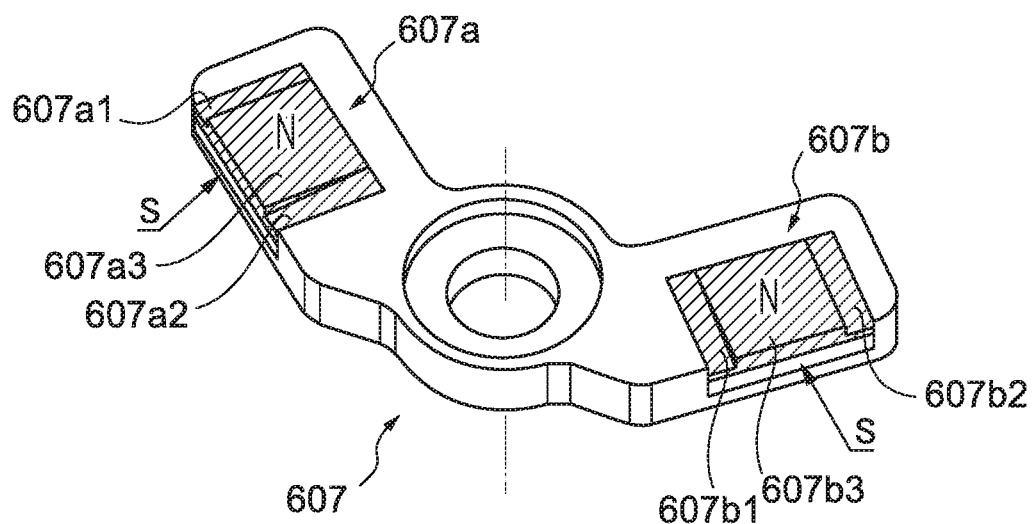
FIGS. 10A and 10B are a perspective view of a movable member according to a third embodiment and a view useful in explaining dimensions of portions of the movable member.
Figure 10B:
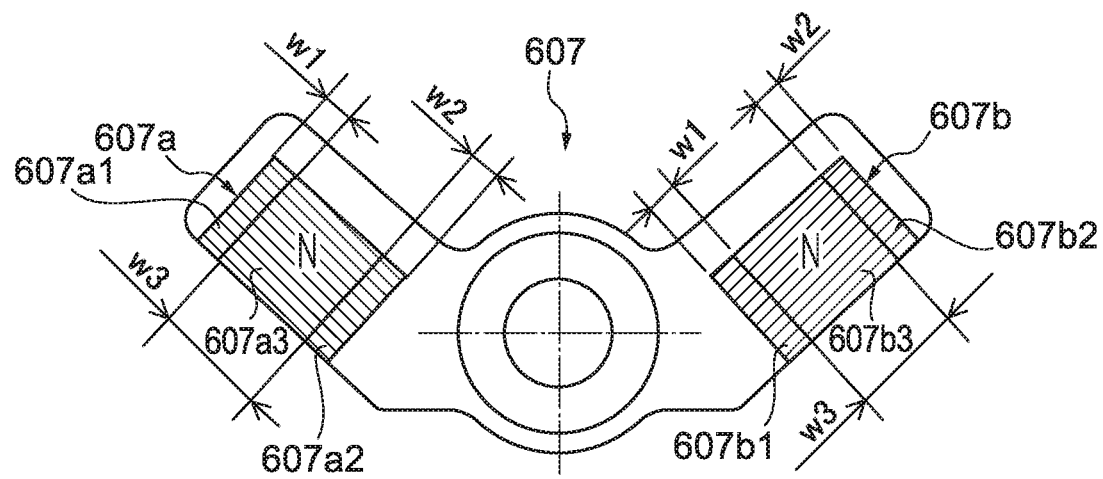

Next, a third embodiment of the present invention will be described. In the third embodiment, a description is given of a variation of the movable member 507 described in the first embodiment. FIG. 10A is a perspective view of a movable member 607. FIG. 10B is a view useful in explaining dimensions of portions of the movable member 607. The movable member 607 is comprised of a first magnetic pole portion 607a and a second magnetic pole portion 607b. Similar to the movable member 507 of the first embodiment, each of the first magnetic pole portion 607a and the second magnetic pole portion 607b has an N pole on a surface opposed to the multipole magnet 505.

The first magnetic pole portion 607a has a flat portion 607a3 having a width w3, which is provided on a central part thereof, as well as an inclined portion 607a1 having a width w1 and an inclined portion 607a2 having a width w2, which are provided on opposite ends of the flat portion 607a3 (ends in a direction substantially orthogonal to the direction of pivotal movement of the first magnetic pole portion 607a). The width w1 of the inclined portion 607a1 and the width w2 of the inclined portion 607a2 are set to an equal value. Although the flat portion 607a3 is orthogonal to a pivotal axis of the movable member 607, the inclined portions 607a1 and 607a2 intersect with the pivotal axis of the movable member 607 at a predetermined angle (hereinafter referred to as the "inclination angle", which is other than 90 degrees). Note that the inclination angle of the inclined portion 607a1 and the inclined portion 607a2 will be described in detail hereinafter. The second magnetic pole portion 607b has substantially the same shape as the first magnetic pole portion 607a, and has an inclined portion 607b1 having the width w1, an inclined portion 607b2 having the width w2, and a flat portion 607b3 having the width w3.

Figure 11A:
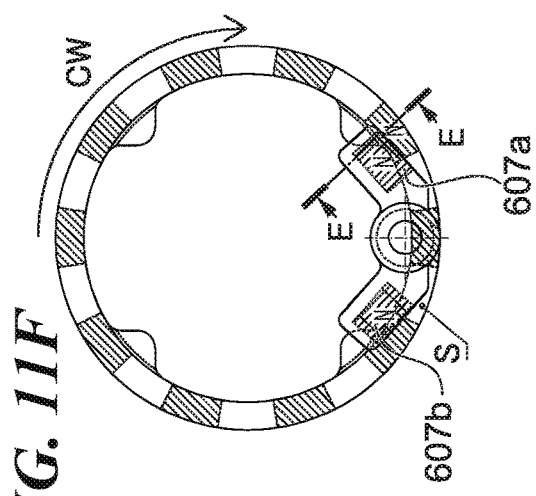
FIGS. 11A to 11G are diagrams useful in explaining operation of the movable member according to the third embodiment.
Figure 11C:
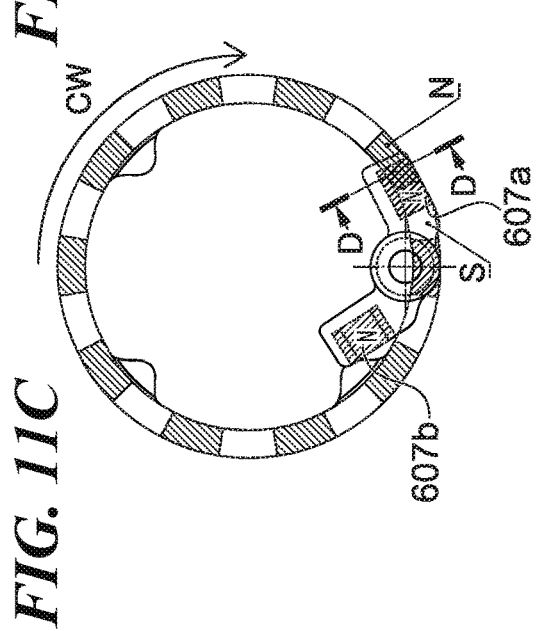
Figure 11F:
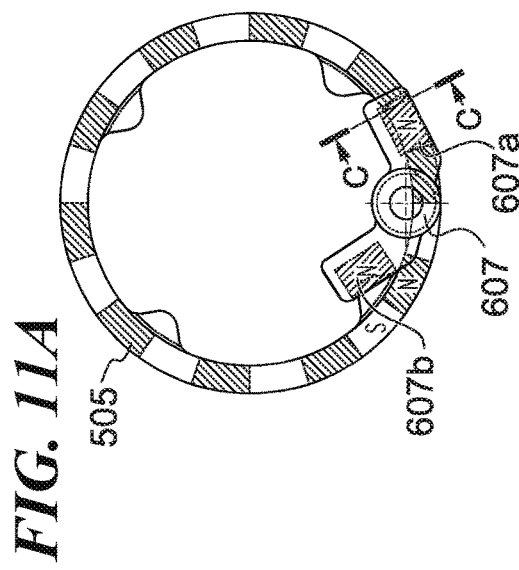

FIGS. 11A to 11G are diagrams useful in explaining operation of the movable member 607. Note that the multipole magnet 505 is the same as described in the first embodiment. Further, FIGS. 11A, 11C, and 11F are diagrams, as viewed from the thrust direction of the multipole magnet 505, and show the multipole magnet 505 seen through the movable member 607.

Figure 11B:
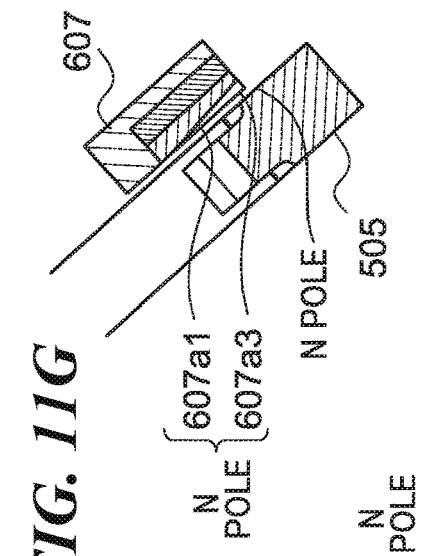

FIG. 11A shows a state in which the movable member 607 is stationary in a stable position. FIG. 11B is a cross-sectional view taken along C-C in FIG. 11A. In the states shown in FIGS. 11A and 11B, one of the S poles of the multipole magnet 505 and the N pole of the first magnetic pole portion 607a of the movable member 607 are opposed to each other so that an attractive force acts therebetween. More specifically, lines of magnetic force (not shown) from the inclined portion 607a1 and the flat portion 607a3 of the first magnetic pole portion 607a flow toward the one of the S poles of the multipole magnet 505, so that an attractive force is generated between the first magnetic pole portion 607a and the multipole magnet 505, whereby the movable member 607 is stable in the stationary state.

Figure 11D:
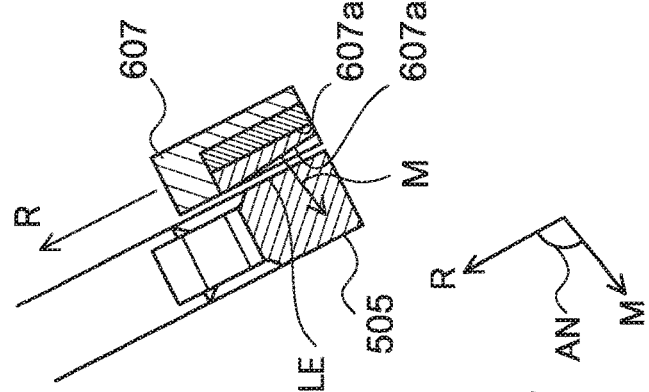

FIG. 11C shows a state in which the multipole magnet 505 rotates from the FIG. 11A state in the CW direction, whereby the inclined portion 607a1 of the first magnetic pole portion 607a and one of the N poles of the multipole magnet 505 are opposed to each other. FIG. 11D is a cross-sectional view taken along D-D in FIG. 11C. Since the lines of magnetic force flow from the inclined portion 607a1 in a direction indicated by an arrow M, which is a direction normal to the inclined portion 607a1, a repelling force is generated between the N pole of the inclined portion 607a1 and the N pole of the multipole magnet 505, the movable member 607 receives a force in a direction opposite to the direction indicated by the arrow M.

Figure 11E:

FIG. 11E is a view showing a relationship between the arrow M and an arrow R indicating the direction of pivotal movement of the first magnetic pole portion 607a. An angle AN formed by the arrow M and the arrow R is obtuse. As a consequence, the force received by the movable member 607 (force in the direction opposite to the direction indicated by the arrow M) contains a component in the direction indicated by the arrow R, and hence acts as a force for pivotally moving the movable member 607 in a direction indicated by the arrow R.

In a construction in which, similar to the movable member 507 of the first embodiment, the whole magnetized surface of the first magnetic pole portion 507a is in parallel with the multipole magnet 505, there is a possibility that the movable member 507 is pivotally moved in a direction opposite to an intended direction when the movable member 507 starts to be moved by a repelling force generated between magnet poles. In this case, since the second magnetic pole portion 507b also cannot be attracted to the multipole magnet 505, it is impossible to produce a desired clicking sensation. To solve this problem, it is envisaged to take a measure for restricting the direction of pivotal movement of the movable member 507 to a predetermined direction, e.g. by providing a stopper, there is a fear of generation of noise, degradation of durability, and the like, caused by collision between the stopper and the movable member 507.

On the other hand, in the movable member 607, by providing the inclined portion 607a1 whose normal direction forms an obtuse angle with the direction of movement of the first magnetic pole portion 607a, in the first magnetic pole portion 607a, it is possible, when the movable member 607 is pivotally moved by a repelling force, to cause the movable member 607 to positively rotate in a desired direction. At this time, the user can obtain an excellent clicking sensation without generating noise or degrading durability.

Figure 11G:
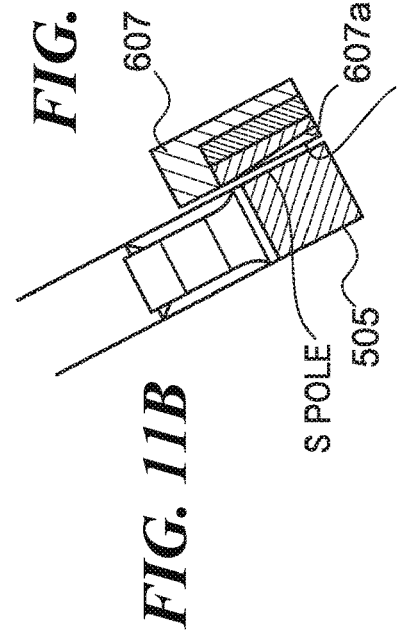

FIG. 11F shows a state in which the multipole magnet 505 has started to rotate from the FIG. 11C state in the CW direction. FIG. 11G is a cross-sectional view taken along E-E in FIG. 11F. In this state, the repelling force continues to be generated between the first magnetic pole portion 607a of the movable member 607 and the one of the N poles of the multipole magnet 505, and an attractive force starts to act between the second magnetic pole portion 607b of the movable member 607 and one of the S poles of the multipole magnet 505.

Although not shown, when the multipole magnet 505 further rotates in the CW direction, the second magnetic pole portion 607b is attracted to the one of the S poles of the multipole magnet 505, and the movable member 607 rotates to a position where the first magnetic pole portion 607a is not opposed to any other S pole of the multipole magnet 505, whereby the movable member 607 is brought to a stable state. This is the same as in the first embodiment, and it is possible to obtain one single clicking sensation by rotating the multipole magnet 505 by an amount corresponding to one divided pole thereof.

Note that in the inclined portions 607a1 and 607a2 of the first magnetic pole portion 607a, the width w1 and the width w2 are equal, and inclinations thereof are symmetrical with respect to the flat portion 607a3. For this reason, for example, also in a case where the multipole magnet 505 is rotated from the FIG. 11A state, in the CCW direction which is opposite to the CW direction in the case described above with reference to FIGS. 11A to 11G, it is possible to obtain an appropriate clicking sensation by positively pivotally moving the movable member 607 in a predetermined direction according to the above-described principle. Further, the first magnetic pole portion 607a and the second magnetic pole portion 607b have substantially the same shape. Therefore, also in a case where the multipole magnet 505 is rotated in a desired direction from a state in which, differently from the FIG. 11A state, the second magnetic pole portion 607b is opposed to the multipole magnet 505, it is possible to obtain a clicking sensation, as will be understood from the description given with reference to FIGS. 11A to 11G.

Further, as is clear from FIG. 10B, the width w3 of the flat portion 607a3 is set to a larger value than the value of the respective widths w1 and w2 of the inclined portions 607a1 and 607a2. Here, even in a construction in which the width w3 is set to 0 so that the whole surface of the first magnetic pole portion 607a is inclined, it is possible to obtain an effect that the movable member 607 is pivotally moved in a desired direction. In this case, however, a magnetic force is reduced which has a component in a direction orthogonal to the magnetic pole surface of the multipole magnet 505, and therefore there is a fear that an obtained clicking sensation is reduced.

On the other hand, the movable member 607 of the third embodiment is configured such that the inclined portions 607a1 and 607a2 are provided on opposite ends of the first magnetic pole portion 607a, each with a required width, and the remaining portion of the first magnetic pole portion 607a is formed as the flat portion 607a3 parallel to the magnetized surfaces of the multipole magnet 505. This makes it possible to maintain an excellent clicking sensation while minimizing reduction of the sensation, and prevent the movable member 607 from pivotally moving in a direction opposite to the desired direction.

Figure 12A:
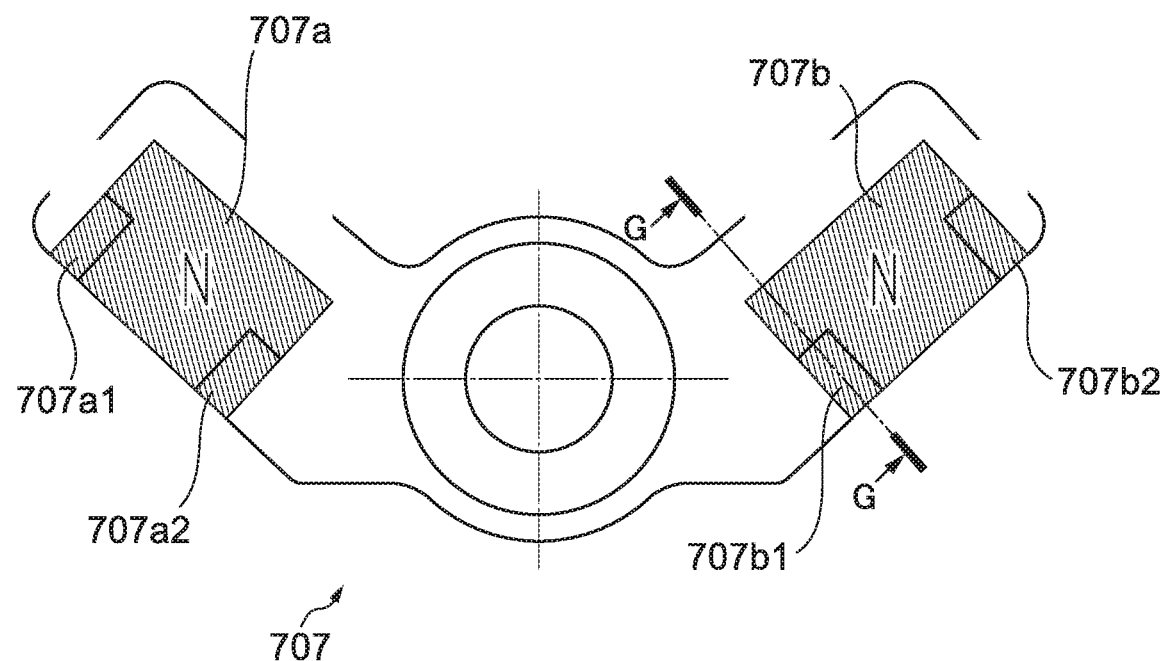
FIGS. 12A and 12B are a plan view and a cross-sectional view of a movable member according to a fourth embodiment.
Figure 12B:
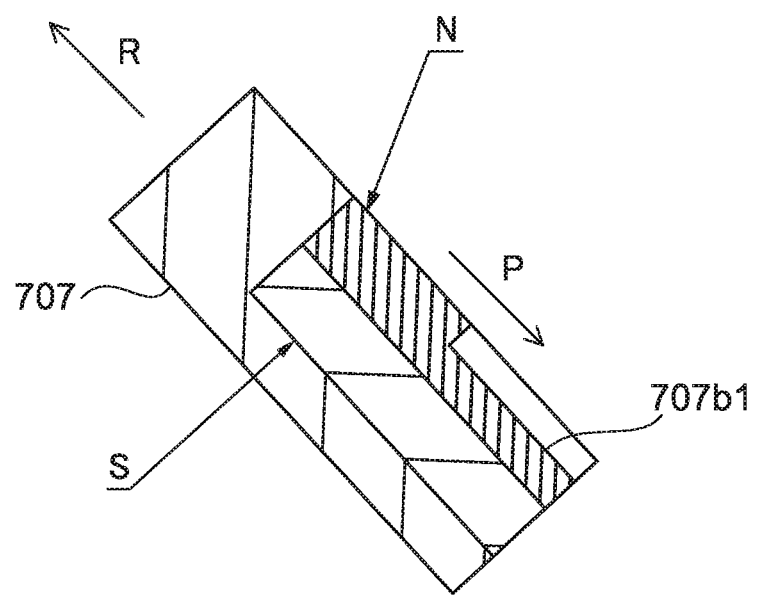

Next, a fourth embodiment of the present invention will be described. In the fourth embodiment, a description is given of a variation of the movable member 607 described in the third embodiment. FIG. 12A is a plan view of a movable member 707. FIG. 12B is a cross-sectional view taken along G-G in FIG. 12A. The movable member 707 includes a first magnetic pole portion 707a and a second magnetic pole portion 707b. The magnetized surface of the first magnetic pole portion 707a has step portions 707a1 and 707a2 formed at ends thereof in the direction of length thereof (direction substantially orthogonal to the direction of pivotal movement of the first magnetic pole portion 707a). Similarly, the magnetized surface of the second magnetic pole portion 707b has step portions 707b1 and 707b2 formed at ends thereof in the direction of length thereof (direction substantially orthogonal to the direction of pivotal movement of the second magnetic pole portion 707b). Similar to the movable member 607 of the third embodiment, the magnetized surface of each of the first and second magnetic pole portions 707a and 707b is magnetized to an N pole.

For example, as shown in FIG. 12B, since the second magnetic pole portion 707b includes the step portion 707b1 at an end thereof in the direction substantially orthogonal to the direction of pivotal movement of the second magnetic pole portion 707b, a magnetic field in the vicinity of the second magnetic pole portion 707b has a component in a direction, indicated by an arrow P, orthogonal to a step direction (normal direction of an upper surface of the second magnetic pole portion 707b). Therefore, when the step portion 707b1 is opposed to an N pole of a multipole magnet (not shown), the step portion 707b1 receives a force in a direction opposite to the direction indicated by the arrow P (i.e. in the direction indicated by the arrow R, in which the movable member 707 rotates). This makes it possible to prevent the movable member 707 from pivotally moving in a direction opposite to a desired direction.

Figure 13A:
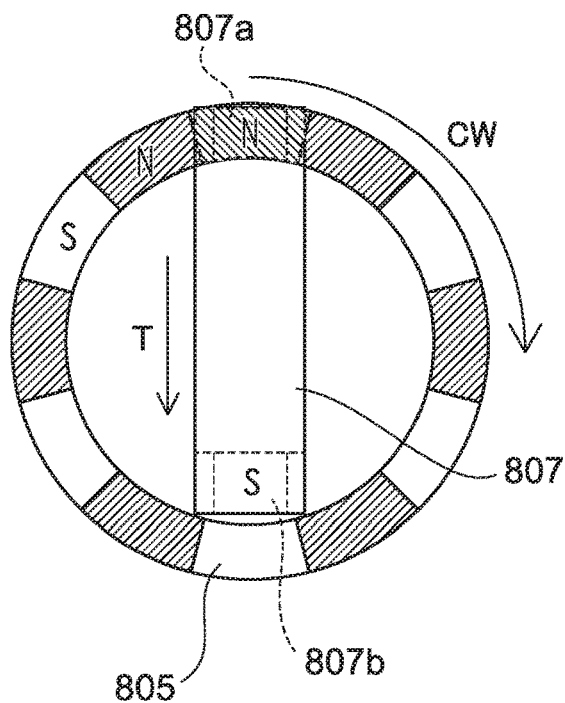
FIGS. 13A to 13D are diagrams useful in explaining the arrangement of a multipole magnet and a movable member according to a fifth embodiment.
Figure 13B:
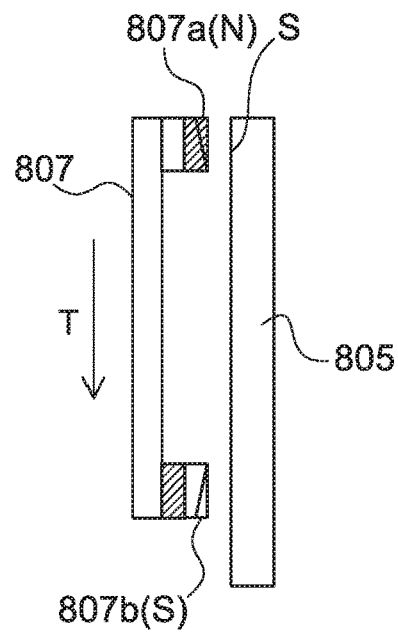

Next, a fifth embodiment of the present invention will be described. FIG. 13A is a plan view showing the arrangement of a multipole magnet 805 and a movable member 807 of the fifth embodiment. FIG. 13B is a side view showing the arrangement of the multipole magnet 805 and the movable member 807. The multipole magnet 805 has a structure in which it is divided into twelve divided poles at equally-spaced intervals in the circumferential direction and six S poles and six N poles are alternatingly formed. The movable member 807 is held by a holding member (not shown) such that the movable member 807 can perform reciprocal movement along a predetermined axis (more specifically, in a direction indicated by an arrow T as a radial direction and a direction opposite to the direction). A surface of one end of the movable member 807 in a longitudinal direction thereof, opposed to the multipole magnet 805, is formed with a first magnetic pole portion 807a as an N pole, and a surface of the other end of the movable member 807, opposed to the multipole magnet 805, is formed with a second magnetic pole portion 807b as an S pole.

The states in FIGS. 13A and 13B show a stable state in which one of the S poles of the multipole magnet 805 and the N pole of the first magnetic pole portion 807a are attracted to each other. When the multipole magnet 805 is rotated in the CW direction, one of the N poles of the multipole magnet 805 and the first magnetic pole portion 807a start to repel against each other, and at the same time, the second magnetic pole portion 807b and another one of the N poles of the multipole magnet 805 start to be attracted to each other. That is, a force for moving the movable member 807 in the direction indicated by the arrow T acts on the movable member 807. When the multipole magnet 805 is thus rotated by an amount corresponding to one divided pole thereof, similar to the above-described embodiments, it is possible to positively produce a clicking sensation by the repelling force and the attractive force generated between the multipole magnet 805 and the movable member 807.

Figure 13C:
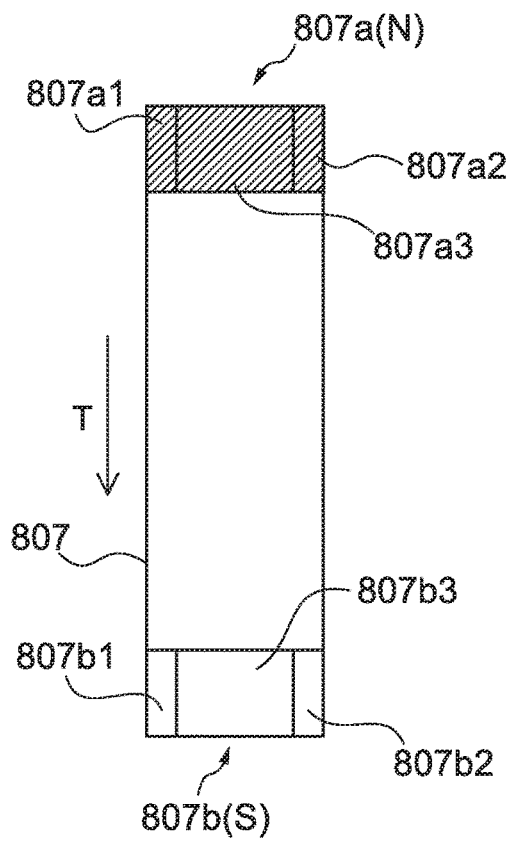
Figure 13D:
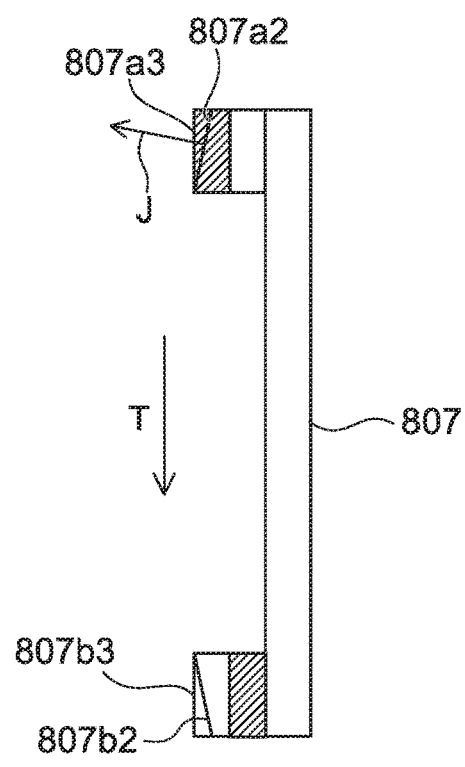

FIG. 13C is a plan view useful in explaining the structure of the movable member 807. FIG. 13D is a side view useful in explaining the structure of the movable member 807. The first magnetic pole portion 807a has sloping portions 807a1 and 807a2 formed at ends thereof in the direction of the width of the movable member 807. The second magnetic pole portion 807b has sloping portions 807b1 and 807b2 formed at ends thereof in the direction of the width of the movable member 807. Note that between the sloping portions 807a1 and 807a2, there is formed a flat portion 807a3 parallel to a plane including the direction of the length of the movable member 807 and the direction of the width thereof. Similarly, between the sloping portions 807b1 and 807b2, there is formed a flat portion 807b3 parallel to the plane including the direction of the length of the movable member 807 and the direction of the width thereof.

The sloping portions 807a1 and 807a2 are designed such that they are oriented in the same direction, and an angle formed by a direction indicated by an arrow J, which is a normal direction of the sloping portions 807a1 and 807a2, and a direction indicated by the arrow T, which is the direction of the movement of the movable member 807, becomes obtuse. For this reason, when the multipole magnet 805 starts to rotate from the FIG. 13A state, a repelling force acting on the movable member 807 comes to have a component in the direction indicated by the arrow T, whereby it is possible to positively move the movable member 807 in a desired direction (the direction indicated by the arrow T).

Similarly, the sloping portions 807b1 and 807b2 are designed as slopes whose normal direction forms an obtuse angle with a direction opposite to the direction indicated by the arrow T. Therefore, also in a case where the multipole magnet 805 is rotated from the state in which the second magnetic pole portion 807b is opposed to the multipole magnet 805, it is possible to positively move the movable member 807 in the direction opposite to the direction indicated by the arrow T, i.e. in a desired direction. As described above, also in the construction for producing a clicking sensation by sliding of the movable member 807, it is possible to positively move the movable member 807 in the desired direction, by forming magnetized surfaces whose normal direction forms an obtuse angle with the direction of the movement of the movable member 807, on the movable member 807.

Further, the first magnetic pole portion 807a includes the flat portion 807a3 and the second magnetic pole portion 807b includes the flat portion 807b3. With this, similar to the movable member 607 of the third embodiment, irrespective of the direction of rotation of the multipole magnet 805 and the position of the movable member 807, it is possible to produce a clicking sensation with no variation while suppressing reduction of the clicking sensation.

Although the present invention has been described based on the preferred embodiment, the present invention is not limited to the above-described embodiments, but it can be practiced in various forms, without departing from the spirit and scope thereof. Further, the above-described embodiments each merely show one embodiment of the present invention, and it is also possible to combine the above-described embodiments as appropriate. For example, although in the first embodiment, the description has been given of the sub dial 50, the relationship between the multipole magnet and the movable member described in the first embodiment can be applied to the rotation operation devices, such as the main dial 30 and the mode dial 40, by changing the shape of the dial operation section.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-026685, filed Feb. 18, 2019, and Japanese Patent Application No. 2019-060926, filed Mar. 27, 2019, which are hereby incorporated by reference herein in their entirety.

What is claimed is:

1. An operation device that includes an operation member that is operated by a user, comprising:
   a magnet that is fixed to the operation member and has a plurality of magnetic poles; and
   a movable member that includes a first magnetic pole portion and a second magnetic pole portion and is arranged such that the movable member is movable relative to the magnet,
   wherein the first magnetic pole portion and the second magnetic pole portion are provided in the movable member such that when the operation member is operated in a state in which an attractive force is acting between the magnet and the first magnetic pole portion, the attractive force acting between the magnet and the first magnetic pole portion is reduced, and also an attractive force comes to act between the magnet and the second magnetic pole portion by movement of the movable member.

2. The operation device according to claim 1, wherein the operation member is held such that the operation member is rotatable about a predetermined rotational axis, and
   wherein the magnet is a ring-shaped magnet that rotates along with rotation of the operation member and has the plurality of magnetic poles formed along a circumferential direction.

3. The operation device according to claim 2, wherein the movable member is held such that the movable member is pivotally movable, and the first magnetic pole portion and the second magnetic pole portion are arranged at positions opposed to the magnet.

4. The operation device according to claim 2, wherein each of the first magnetic pole portion and the second magnetic pole portion is formed with a portion which is configured such that a direction of a magnetic field at a magnetized surface of the portion and a direction of the movement of the movable member form an obtuse angle.

5. The operation device according to claim 2, wherein each of the first magnetic pole portion and the second magnetic pole portion is formed with a sloping portion whose normal direction forms an obtuse angle with a direction of movement of the magnet.

6. The operation device according to claim 2, wherein each of the first magnetic pole portion and the second magnetic pole portion is formed with a step portion in a direction forming an obtuse angle with a direction of the movement of the movable member.

7. The operation device according to claim 1, wherein the operation member is held such that the operation member is slidable in a predetermined direction, and
   wherein the magnet has the plurality of magnetic poles formed along a direction of movement of the operation member.

8. The operation device according to claim 7, wherein the operation member is provided with a restriction member for restricting a range of pivotal movement of the movable member.

9. The operation device according to claim 1, wherein along with movement of the magnet, the movable member moves on a plane parallel to a direction of the movement of the magnet, according to an action force dependent on a relationship between the magnet and the first and second magnetic pole portions.

10. The operation device according to claim 9, wherein a predetermined gap is set between the first and second magnetic pole portions and the magnet.

11. An electronic apparatus including:
    the operation device as recited in claim 1; and
    a setting unit configured to make settings according to operation of the operation member.

12. An operation device provided in an electronic apparatus, comprising:
    an operation section that is disposed such that the operation section is movable in a desired direction;
    a multipole magnet that is mounted on the operation section such that the multipole magnet is movable in unison with the operation section, and has a plurality of magnetic poles in the desired direction; and
    a movable member that includes a first magnetic pole portion and a second magnetic pole portion and is arranged such that the movable member is movable in a predetermined direction,
    wherein the first magnetic pole portion includes a portion that generates a magnetic field in a direction which forms an obtuse angle with a direction of movement of the first magnetic pole portion, and the second magnetic pole portion includes a portion that generates a magnetic field in a direction which forms an obtuse angle with a direction of movement of the second magnetic pole portion, and
    wherein when the operation section is operated such that the multipole magnet is moved from a state in which an attractive force is acting between one of the magnetic poles of the multipole magnet and the first magnetic pole portion, in a direction in which the attractive force is reduced, the movable member is moved such that an attractive force is generated between another one of the magnetic poles of the multipole magnet and the second magnetic pole portion.

13. The operation device according to claim 12, wherein the multipole magnet has a ring shape, and is divided into the plurality of magnetic poles in a circumferential direction, and
    wherein the desired direction is a direction in which the multipole magnet is rotated in the circumferential direction.

14. The operation device according to claim 13, wherein the movable member is axially supported such that the movable member is pivotally movable, and wherein a pivotal shaft that axially supports the movable member is provided inside an inner periphery of the multipole magnet.

15. The operation device according to claim 14, wherein a gap is provided between an outer peripheral surface of the pivotal shaft that pivotally movably supports the movable member and an inner peripheral surface of a hole portion of the movable member into which the pivotal shaft is inserted.

16. The operation device according to claim 12, wherein the multipole magnet is divided into the plurality of magnetic poles in a linear direction, and wherein the desired direction is a direction in which the multipole magnet is slid in the linear direction.

17. The operation device according to claim 12, wherein the movable member is movable in a direction parallel to respective magnetized surfaces of the first magnetic pole portion and the second magnetic pole portion.

18. The operation device according to claim 12, wherein the first and second magnetic pole portions and the multipole magnet are out of contact with each other.

19. The operation device according to claim 12, wherein in the state in which the attractive force is acting between one of the magnetic poles of the multipole magnet and the first magnetic pole portion, an overlapping area between the one of the magnetic poles and the first magnetic pole portion is seven or more times as large as an overlapping area between the second magnetic pole portion and the multipole magnet, as viewed from a direction in which the multipole magnet and the first magnetic pole portion are opposed to each other.

20. The operation device according to claim 12, further including a restriction member for restricting movement of the movable member.

21. The operation device according to claim 12, wherein the first magnetic pole portion has a magnetized surface whose normal direction forms an obtuse angle with the direction of the movement of the first magnetic pole portion, in at least part thereof, and the second magnetic pole portion has a magnetized surface whose normal direction forms an obtuse angle with the direction of the movement of the second magnetic pole portion, in at least part thereof.

22. The operation device according to claim 12, wherein the first magnetic pole portion generates a magnetic field that includes a component in a direction orthogonal to the direction of the movement of the first magnetic pole portion, and the second magnetic pole portion generates a magnetic field that includes a component in a direction orthogonal to the direction of the movement of the second magnetic pole portion.

23. The operation device according to claim 12, wherein the first magnetic pole portion and the second magnetic pole portion have the same shape.

24. An electronic apparatus including the operation device as recited in claim 12.

* * * * *